United States Patent
Toyoda et al.

(10) Patent No.: US 7,151,619 B2
(45) Date of Patent: *Dec. 19, 2006

(54) IMAGE FORMATION APPARATUS

(75) Inventors: Yasutaka Toyoda, Hitachi (JP); Tatsuki Inuduka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1067 days.

This patent is subject to a terminal disclaimer.

(21) Appl. No.: 10/101,163

(22) Filed: Mar. 20, 2002

(65) Prior Publication Data

US 2003/0081257 A1    May 1, 2003

(30) Foreign Application Priority Data

Oct. 30, 2001    (JP)    .............................. 2001-332041

(51) Int. Cl.
 *H04N 1/405*    (2006.01)
(52) U.S. Cl. .................... 358/3.13; 358/3.16; 358/3.23
(58) Field of Classification Search .............. 358/3.13, 358/3.14, 3.16, 3.2, 3.26, 1.9, 3.06, 3.22, 358/533–536, 3.23; 382/270, 275

See application file for complete search history.

(56) References Cited

U.S. PATENT DOCUMENTS

| | | | |
|---|---|---|---|
| 5,726,772 A | 3/1998 | Parker et al. | 358/3.19 |
| 6,108,450 A | 8/2000 | Ueda | 382/270 |
| 6,356,363 B1 | 3/2002 | Cooper et al. | 358/1.9 |
| 6,459,817 B1 | 10/2002 | Matsushiro | 382/270 |
| 6,515,768 B1 | 2/2003 | Deschuytere et al. | 358/3.06 |
| 6,700,680 B1 | 3/2004 | Toyoda et al. | 358/3.03 |
| 6,985,259 B1 | 1/2006 | Okinaka et al. | 358/3.1 |
| 2001/0038465 A1 | 11/2001 | Okinaka et al. | 358/456 |
| 2002/0071140 A1 | 6/2002 | Suzuki et al. | 358/3.01 |

FOREIGN PATENT DOCUMENTS

| | | |
|---|---|---|
| JP | 04104576 A | 4/1992 |
| JP | 07123259 A | 5/1995 |
| JP | 10150565 A | 6/1998 |

*Primary Examiner*—Scott A. Rogers
(74) *Attorney, Agent, or Firm*—Antonelli, Terry, Stout and Kraus, LLP.

(57) ABSTRACT

An image formation apparatus includes an aperiodic data generating unit for generating aperiodic data between pixel areas having a neighboring relation every pixel area comprising a plurality of pixels having an interlocking relation of the image data, a threshold value deciding unit for converting the aperiodic data into a plurality of threshold data for forming a systematic dot array in the pixel area, and a gradation conversion processing unit for performing a gradation converting process by comparing the image data with the threshold data, thereby reducing a signal processing amount as compared with that in case of performing the propagating process on a pixel unit basis.

14 Claims, 13 Drawing Sheets

FIG. 8A
MEAN ERROR MINIMIZING METHOD
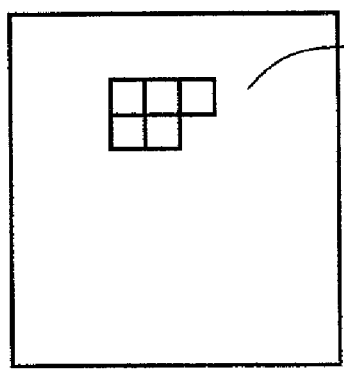
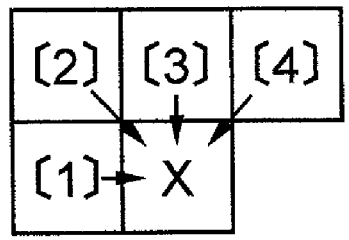
FIG. 8B
ERROR DIFFUSING METHOD
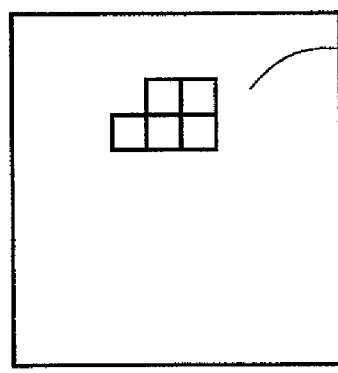
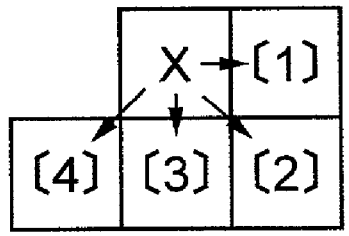

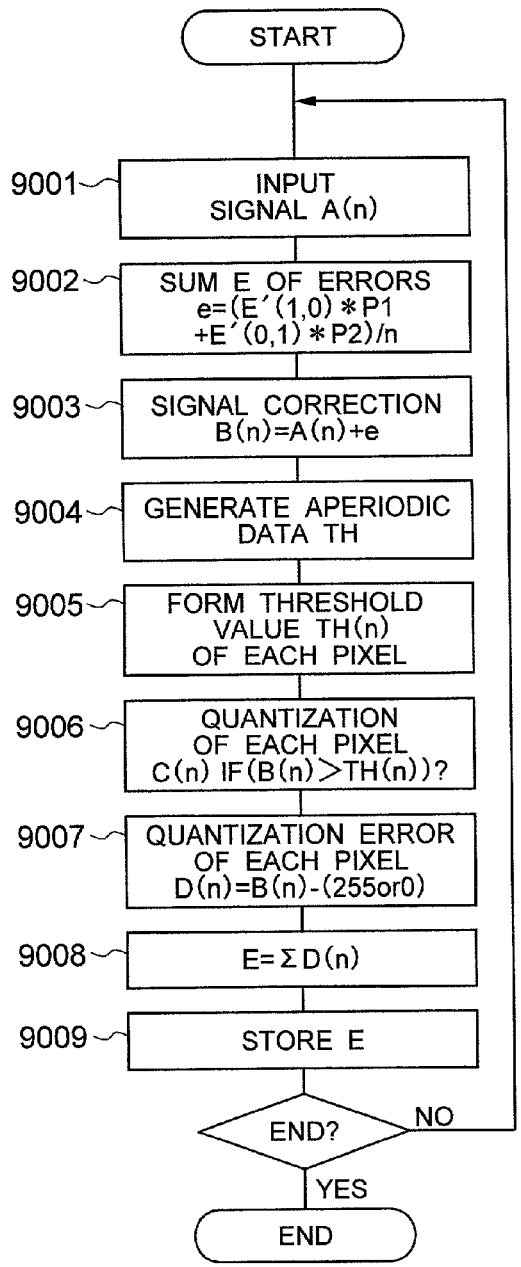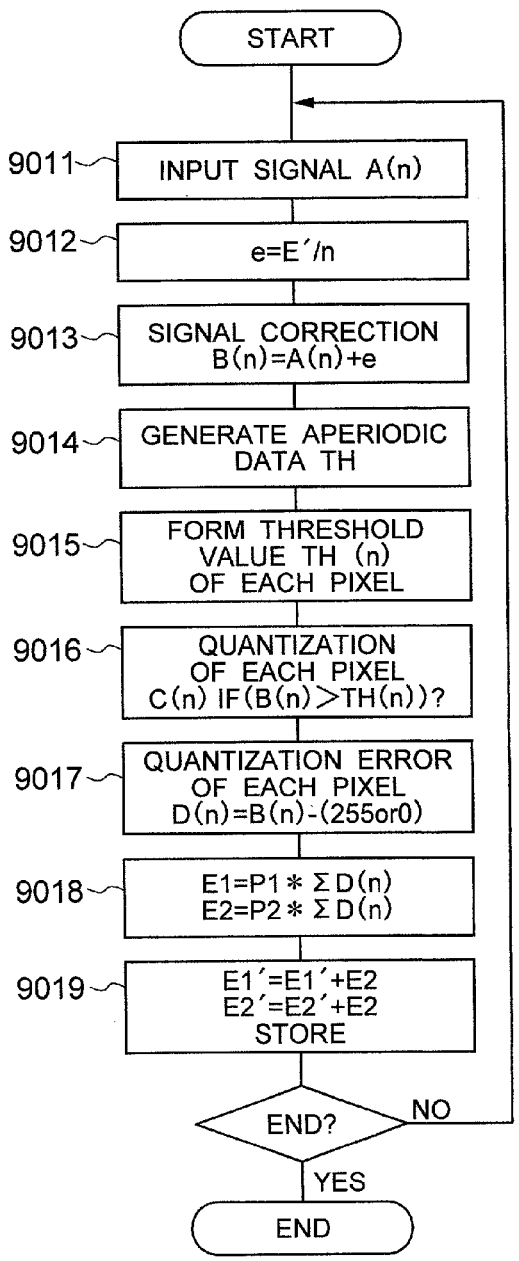

INPUT IMAGE SIGNAL (0~15)  DITHER MATRIX  OUTOUT IMAGE SIGNAL (0or1)

| | i=0 | | i=1 | | i=2 | |
|---|---|---|---|---|---|---|
| | x=0 | x=1 | x=2 | x=3 | x=4 | x=5 |
| y=0 | THa/4 | 3THa/4 | THb/4 | 3THb/4 | THc/4 | 3THc/4 |
| j=0 | ---THa--- | | ---THb--- | | ---THc--- | |
| y=1 | 2THa/4 | THa | 2THb/4 | THb | 2THc/4 | THc |

TARGET PIXEL AREA e00=e01=e10=e11(E01/2+E10/2)/4

| INPUT (APERIODIC DATA DITHER MATRIX THRESHOLD VALUE) | OUTPUT (THRESHOLD VALUE) | | | |
|---|---|---|---|---|
| | PIXEL POSITION (x,y) | | | |
| | (0,0) | (0,1) | (1,0) | (1,1) |
| 0 | 0 | 0 | 0 | 0 |
| 1 | 0.25 | 0.5 | 0.75 | 1 |
| 2 | 0.5 | 1 | 1.5 | 2 |
| 3 | 0.75 | 1.5 | 2.25 | 3 |
| 4 | 1 | 2 | 3 | 4 |
| 5 | 1.25 | 2.5 | 3.75 | 5 |
| 6 | 1.5 | 3 | 4.5 | 6 |
| 7 | 1.75 | 3.5 | 5.25 | 7 |
| 8 | 2 | 4 | 6 | 8 |
| 9 | 2.25 | 4.5 | 6.75 | 9 |
| 10 | 2.5 | 5 | 7.5 | 10 |
| 11 | 2.75 | 5.5 | 8.25 | 11 |
| 12 | 3 | 6 | 9 | 12 |
| ⋮ | ⋮ | ⋮ | ⋮ | ⋮ |

PIXEL  PIXEL AREA

| 120 (1) | 126 (3) |
|---|---|
| (2) 110 | (4) 130 |

| 50 (1) | 150 (3) |
|---|---|
| (2) 100 | (4) 200 |

| 1 (1) | 0 (3) |
|---|---|
| (2) 1 | (4) 0 |

| -135 (1) | 150 (3) |
|---|---|
| (2) -145 | (4) 200 |

(a) B(1) TO B(4)   (b) TH(1) TO TH(4)   (c) C(1) TO C(4)   (d) D(1) TO D(4)

$TH(a,b) = matrix[a\%256][b\%256]$
$TH(c,d) = matrix[c\%256][d\%256]$

FIG. 20
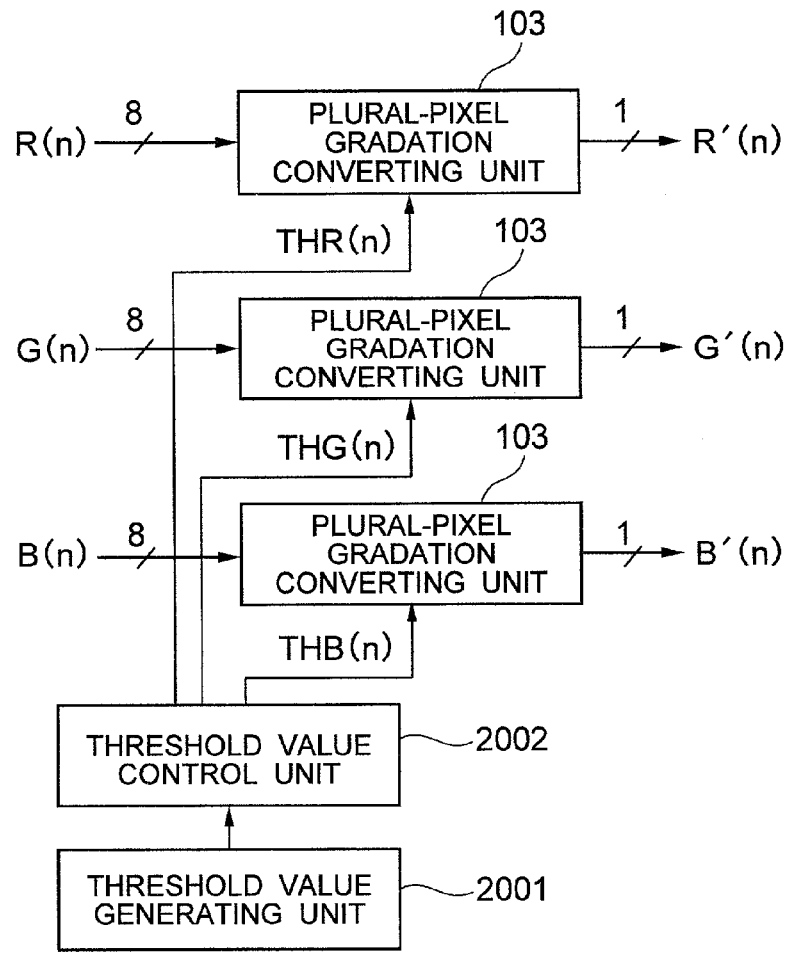
FIG. 21A          FIG. 21B
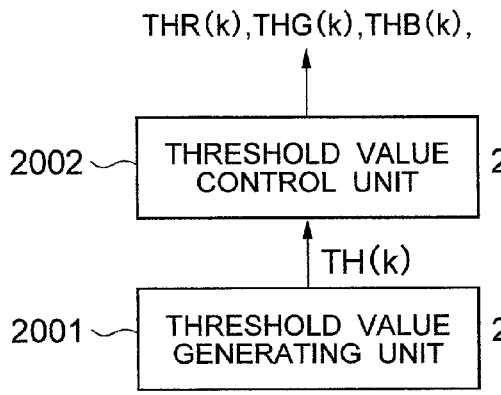
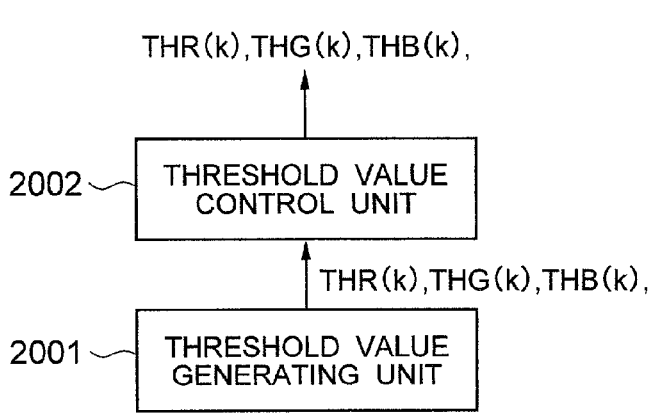

IMAGE FORMATION APPARATUS

BACKGROUND OF THE INVENTION

1. Field of the Invention

The invention relates to an image processing apparatus and, more particularly, to an image formation apparatus for gradation converting image data including periodicity into data in a print format of printer of an electrophotographic system.

2. Description of the Related Art

In recent years, performance of image apparatuses for inputting, displaying, and outputting an image has remarkably been improved. As typical examples, there are a 12-bits/pixel input scanner, a 10-bits/pixel display, and a 4-bits/pixel output printer.

In such image apparatuses, since image data is handled by a data format adapted to gradation reproducing ability of each apparatus, for example, in the case where the image data inputted by the scanner is printed by the printer, it is necessary to convert the number of gradations of the image inputted by the scanner into the number of gradations which can be reproduced by the printer (hereinafter, such a conversion is referred to as a gradation conversion).

For example, in a printer dependent on an electronic photographic system, a gradation conversion system called a dither method is used. As shown in FIG. 10, according to the dither method, by using a dither matrix in which (N×N) pieces of threshold values are arranged, the threshold values are compared with an image signal, thereby determining ON/OFF for dots.

Since the number of reproducing gradations of the apparatus such as scanner or monitor for inputting the image data to the printer is generally larger than that of the printer, a density of ON/OFF of the dots is locally adjusted by using the dither matrix and the number of gradations of the input image is falsely expressed. Such a dither matrix is classified mainly into a dot concentration type in which the dots concentrate regularly by gradually increasing the threshold value from the center of the matrix and a dot distribution type in which the threshold values are arranged at random.

However, according to the electronic photographic system printer, for example, in the case where the number of output gradations is equal to a binary value (black or white), if the image data including isolated dots such that one pixel is a black pixel and eight peripheral pixels are white pixels is supplied, toner is hard to be stably adhered onto a photosensitive material and a portion of the isolated dot cannot be printed, so that there is a problem such that the gradation of the input data is not reflected to a printed result. Therefore, the dither matrix of the dot concentration type such that the black pixels concentrate on two or four pixels is used.

As an apparatus to which image apparatuses of different gradation reproducing abilities are connected, there is a copying apparatus in which a scanner and an electronic photographic system printer are implemented as shown in FIG. 11. Such a copying apparatus is used for printing data from a personal computer or copying printed matter. Most of the printed matters as targets of the copy have a period of a density change of a light/dense pattern as shown in FIG. 12. It is based on an image format according to printing characteristics or the number of reproducing gradations of the printer and is peculiar to the printer.

In the case where the printed matter having such a period of the light/dense pattern is read by the scanner and gradation converted for use in the electrophotographic system printer, a moire occurs and deterioration in picture quality is caused. The moire is caused by interference between the period of the light/dense pattern included in the printed matter and the period of the light/dense pattern which is formed by the dither matrix of the gradation conversion system.

As one of methods of suppressing such a moire, there is a method disclosed in JP-A-4-104576. According to this method, the periodicity of printed matter is lightened by adding a low pass filter to the front stage of the gradation conversion. However, there are variety of periods as a period included in the printed matter, and in order to obtain a good result for all printed matter, the period included in the printed matter has to be discriminated and coefficients of the low pass filter have to be changed. There is, consequently, a problem such that a scale of circuit which is used for suppressing the moire is enlarged and a load of processes also increases.

As another method of suppressing the moire, as disclosed in JP-A-7-123259, there is a method whereby an error diffusing method is applied to the gradation conversion system. The error diffusing method is a gradation conversion system such that a process of propagating quantization errors caused by quantization based on a threshold value to data which is not quantized is executed on a pixel unit basis, thereby realizing the gradation reproduction of high precision. According to the error diffusing method, however, since isolated dots which cannot be printed by the printer of the electronic photographic system are formed particularly in a low density portion, it is necessary to suppress the isolated dots by combining a template process and other processes. There is also a problem such that in order to prevent causes of deterioration in the picture quality such as a chain-like texture that is peculiar to the error diffusing method, a circuit scale is enlarged and a load of processes also increases.

On the other hand, like "Binarizing method by threshold matrix error diffusing method and memory medium" disclosed in JP-A-10-150565, there is also a system in which by using a blue noise mask as a threshold value in the error diffusing method, various problems of the picture quality which are peculiar to the error diffusion are improved. In a manner similar to the error diffusing method, such a system also has a problem such that isolated dots are formed and the gradation is not reflected to a print result.

SUMMARY OF THE INVENTION

In consideration of the problems as mentioned above, it is an object of the invention to provide an image formation apparatus in which in a gradation conversion system of the electronic photographic system, a moire which is caused in the case where an input image including periodicity is gradation converted is suppressed and the generation of isolated dots by which the gradation is not reflected to a print result is reduced.

Another object of the invention is to simplify the gradation converting process and realize a high processing speed.

To accomplish the above objects, according to the invention, data which is aperiodic between pixel areas having a neighboring relation is formed and converted into a plurality of threshold data for forming a systematic dot array in the pixel area, and threshold values are compared with image data. Thus, data in a print format having the systematic dot array in which a moire is suppressed between the pixel areas and the generation of isolated dots has suppressed in the pixel area can be formed.

According to the invention, a threshold value of blue noise mask which is usually made to correspond to data on a pixel unit basis is made to correspond to a pixel area and converted into a plurality of threshold data for forming a systematic dot array in the pixel area, and the threshold values are compared with image data. Thus, data in a print format having the systematic dot array in which a moire is suppressed between the pixel areas and the generation of isolated dots has been suppressed in the pixel area can be formed.

According to the invention, a dither matrix constructed by n numbers of threshold data for forming a dot array which is aperiodic between threshold value areas and systematic in the threshold value area is used. Thus, data in a print format having the systematic dot array in which a moire is suppressed between the threshold value areas and the generation of isolated dots has been suppressed in the threshold value area can be formed.

According to the invention, a threshold value of a blue noise mask is made to correspond to a pixel area, a dither matrix in which the threshold value of the blue noise mask is converted into a plurality of threshold data for forming a systematic dot array in the pixel area and the plurality of threshold data is arranged is used, and the threshold values are compared with image data. Thus, data in a print format having the systematic dot array in which a moire is suppressed between the pixel areas and the generation of isolated dots has been suppressed in the pixel area can be formed.

According to the invention, a conversion error which is caused when data in a print format is determined by comparing image data with threshold data is propagated to the image data which is not quantized on a pixel area unit basis or on a threshold value area unit basis. Thus, a moire which is caused by a gradation converting process based only on the threshold value comparison is suppressed and, further, isolated dots which are caused by the propagation of a quantization error of a pixel unit can be suppressed.

According to the invention, a correspondence relation between the aperiodic data or the threshold value of the blue noise mask and the threshold value which is made to correspond to each pixel in the pixel area is preliminarily stored as a table, thereby making a calculation for obtaining the threshold values unnecessary. The threshold data can be obtained at a high speed.

According to the invention, the systematic dot array is a threshold value array such that dots concentrate in the pixel area or the threshold value area due to a decrease in luminance value or an increase in density value of the image data.

According to the invention, for example, in the case where the aperiodic data is assumed to be TH and the number of pixels in the pixel area or the number of threshold data in the threshold value area is equal to N, a plurality of threshold data to form the systematic dot array in the pixel area or the threshold value area is the aperiodic data and the threshold data determined by the number of pixels in the pixel area or the number of threshold data in the threshold value area in a manner such that the threshold value which is used for quantization of the first pixel is equal to $1 \cdot TH/N$, the threshold value which is used for quantization of the second pixel is equal to $2 \cdot TH/N$, and the threshold value which is used for quantization of the Nth pixel is equal to $N \cdot TH/N$, respectively.

Or, for example, in the case where the threshold value of blue noise mask is assumed to be TH and the number of pixels in the pixel area or the number of threshold values in the threshold value area is equal to N, a plurality of threshold data to form the dot array which is systematic in the pixel area or the threshold value area is the threshold value of blue noise mask and the threshold data determined by the number of pixels in the pixel area or the number of threshold values in the threshold value area in a manner such that the threshold value which is used for quantization of the first pixel is equal to $TH/N$, the threshold value which is used for quantization of the second pixel is equal to $2 \cdot TH/N$, and the threshold value which is used for quantization of the Nth pixel is equal to TH, respectively.

According to the invention, for example, in the case where the number of pixels in the pixel area or the number of threshold values in the threshold value area is equal to n and quantization errors of the image data corresponding to the pixel areas or the threshold value areas are assumed to be E1 to En, in the correction value determination unit, the quantization error in the pixel areas or the threshold value areas is the sum ($\Sigma En$) of them, and the correction value is determined to be $1/n \cdot \Sigma En$.

Further, according to the invention, there is provided a method of forming a dither matrix, wherein each threshold value of blue noise mask is made to correspond to a threshold value area comprising a plurality of threshold data having an interlocking relation, and the threshold value of the blue noise mask is converted into a plurality of threshold data for forming a systematic dot array in the threshold value area, thereby forming the dither matrix.

Further, according to the invention, there is provided a copying apparatus having a scanner unit, a printer unit, and a gradation converting unit for converting image data read by the scanner unit into print data to be printed by the printer unit, wherein the foregoing image formation apparatus is applied to the gradation converting unit.

According to the invention, there is provided an image formation apparatus for converting image data including periodicity into data in a print format of a printer of an electronic photographic system, wherein threshold data for forming a systematic dot array in a pixel area comprising a plurality of pixels having an interlocking relation is formed from data which is aperiodic between the pixel areas. Thus, it is possible to obtain a gradation conversion result in which the generation of a moire between the pixel areas is suppressed and which has a systematic dot array such as dot concentration or the like in the pixel area.

The propagating process of propagating the quantization error caused by the comparison of the image data and the threshold data to the image data is executed on a unit basis of a pixel area for forming the systematic dot array. Thus, as compared with the case of performing the propagating process on a pixel unit basis, an amount of signal processes can be reduced and a data capacity which is used for accumulating the quantization errors can be also reduced. Further, the moire which is caused in the gradation converting process based only on the threshold value comparison can be suppressed, and the isolated dots which are generated by the error propagation of the pixel unit can be suppressed.

Other objects, features and advantages of the invention will become apparent from the following description of the embodiments of the invention taken in conjunction with the accompanying drawings.

BRIEF DESCRIPTION OF THE DRAWINGS

FIGS. 8A and 8B are explanatory diagrams of a propagating method of quantization errors in pixel areas according to a gradation conversion system;

FIGS. 9A and 9B are flowcharts showing a procedure for a gradation converting process according to an embodiment of the invention;

FIG. 20 is a block diagram showing an image formation apparatus of the invention corresponding to a color image; and FIGS. 21A and 21B are explanatory diagrams showing the operation of a threshold value control unit.

DESCRIPTION OF THE EMBODIMENTS

Figure 7A:
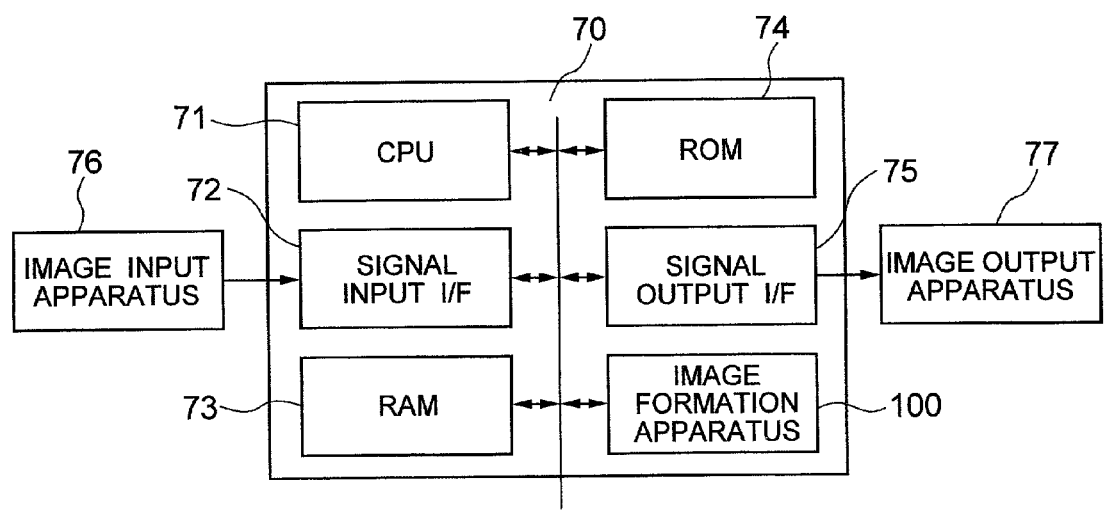
FIGS. 7A and 7B are constructional diagrams of hardware and software for realizing image formation apparatuses.

As shown in an image formation apparatus 100 in FIG. 7A, an embodiment of the image formation apparatus of the invention can be implemented as hardware into an information processing control apparatus 70 to which an image input apparatus 76 such as a scanner and an image output apparatus 77 such as a printer are connected.

The information processing control apparatus 70 is constructed by: hardware such as CPU, ASIC; a memory; and an image input/output interface. Specifically speaking, the information processing control apparatus 70 is constructed by: a CPU 71 for controlling an input/output of an image signal and controlling the image formation apparatus 100; a signal input I/F 72 for inputting image data from the image input apparatus 76 to the information processing control apparatus 70; an RAM 73 for accumulating the inputted image data and storing an image processing result; an ROM 74 for storing parameters and an image processing program which are handled in an image process; the image formation apparatus 100 according to the invention; and a signal output I/F 75 for outputting the image processing result to the image output apparatus 77. As will be explained hereinlater, the image formation apparatus 100 is hardware such as an ASIC or the like.

The signal input I/F, the RAM, the ROM, an image processing circuit, and the signal output I/F will be specifically explained hereinbelow. The signal input I/F 72 is an interface such as USB, IEEE1394, Centronics, memory card, PCI, Ethernet, or the like and inputs the image signal from the image input apparatus 76 to the information processing control apparatus 70. The RAM 73 is a memory such as SDRAM, SRAM, DRAM, memory card, hard disk, or the like for accumulating the image data and storing parameters. The ROM 74 is a memory such as a flash ROM or the like for storing the parameters which are handled in the image formation apparatus 100 and the control program or the like which is used in the CPU 71. The signal output I/F 75 is an interface such as USB, IEEE1394, Centronics, memory card, PCI, Ethernet, or the like and outputs the image processing result to the image output apparatus 77.

Figure 7B:
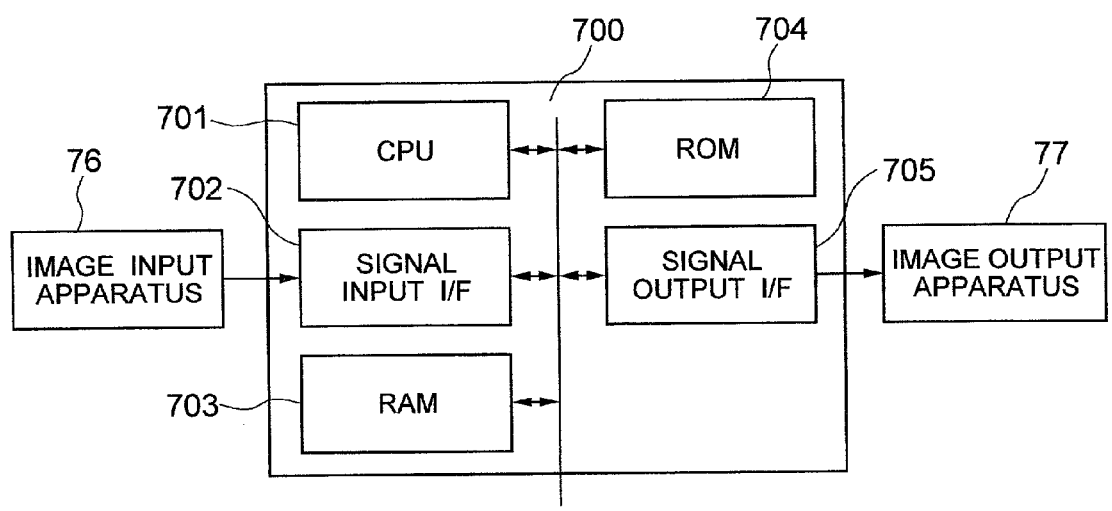
Figure 10:
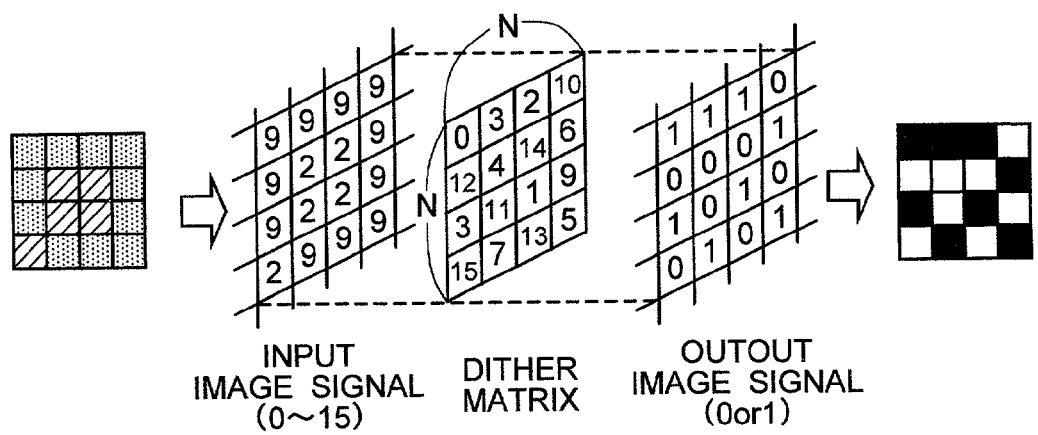
FIG. 10 is an explanatory diagram of a dither system.
Figure 11:
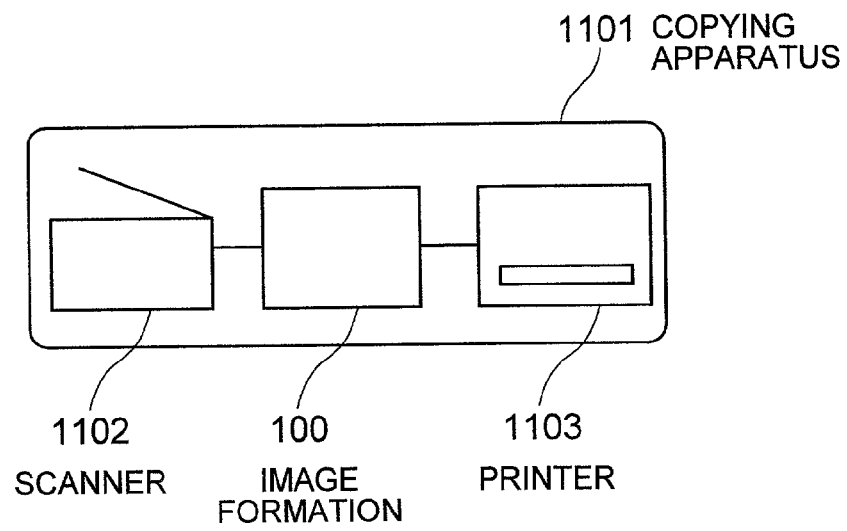
FIG. 11 is a schematic constructional diagram of a conventional copying apparatus.

As shown in FIG. 7B, the image formation apparatus 100 can be also implemented as software into an information processing control apparatus 700 to which the image input apparatus 76 such as a scanner and the image output apparatus 77 such as a printer are connected.

The information processing control apparatus 700 is constructed by a CPU, a memory, and an image input/output interface. Specifically speaking, the information processing control apparatus 700 is constructed by: a CPU 701 for executing a control of an input/output of the image signal and functions of the image formation apparatus 100 by software processes; a signal input I/F 702 for inputting the image data from the image input apparatus 76 to the information processing control apparatus 700; an RAM 703 for accumulating the inputted image data and storing the image processing result; an ROM 704 for storing the parameters which are handled in the image process and an image processing program for realizing the functions of the image formation apparatus 100 by software processes; and a signal output I/F 705 for outputting the image processing result to the image output apparatus 77.

Since the signal input I/F and signal output I/F are similar to those shown in FIG. 7A, the CPU 701, RAM 703, and ROM 704 will be specifically explained hereinbelow. The CPU 701 executes control of the input/output of the image signal and the functions of the image formation apparatus 100 by the software processes. The program for executing the software processes has been stored in the RAM 703 or ROM 704, which will be explained hereinlater. The CPU 701 executes the software processes in accordance with this program. The RAM 703 is a memory such as SDRAM, SRAM, DRAM, memory card, hard disk, or the like for accumulating the image data and storing the parameters. The ROM 704 is a memory such as a flash ROM or the like for storing the parameters which are handled by the image formation apparatus 100, the control program which is used in the CPU 701, and the image processing program for realizing the functions of the image formation apparatus 100 by the software processes, and the like.

As described above, the image formation apparatus 100 can be realized by hardware or software. The image formation apparatus 100 will be specifically explained hereinbelow by using embodiments.

(First Embodiment)

Figure 1:
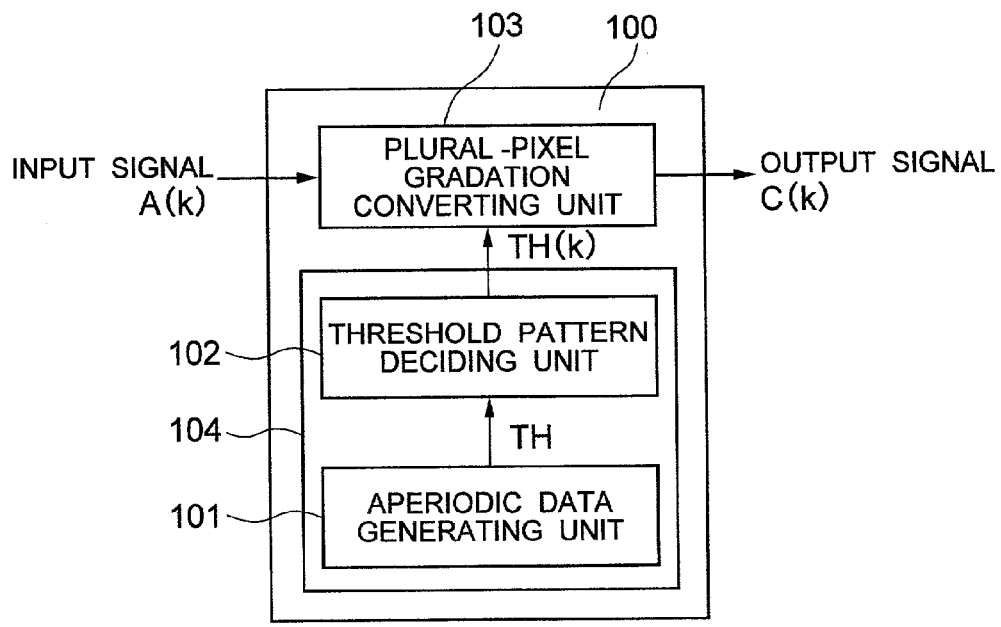
FIG. 1 is a block diagram showing a first embodiment of an image formation apparatus of the invention.

The first embodiment according to the image formation apparatus of the invention will now be described. FIG. 1 shows a construction of the image formation apparatus. The image formation apparatus 100 is constructed by: a threshold value generating unit 104 comprising an aperiodic data generating unit 101 for generating aperiodic data TH between pixel areas every pixel area constructed by n pixels having an interlocking relation and a threshold pattern deciding unit 102 for converting the aperiodic data TH into threshold values TH(1 to n) of each pixel for systematically concentrating dots lest isolated dots are generated in the pixel area; and a plural-pixel gradation converting unit 103 for comparing image signals A(1 to n) in the pixel areas with the threshold values TH(1 to n) and executing quantization of each pixel and a propagating process of quantization errors caused by the quantization on a pixel area unit basis.

Figure 2:
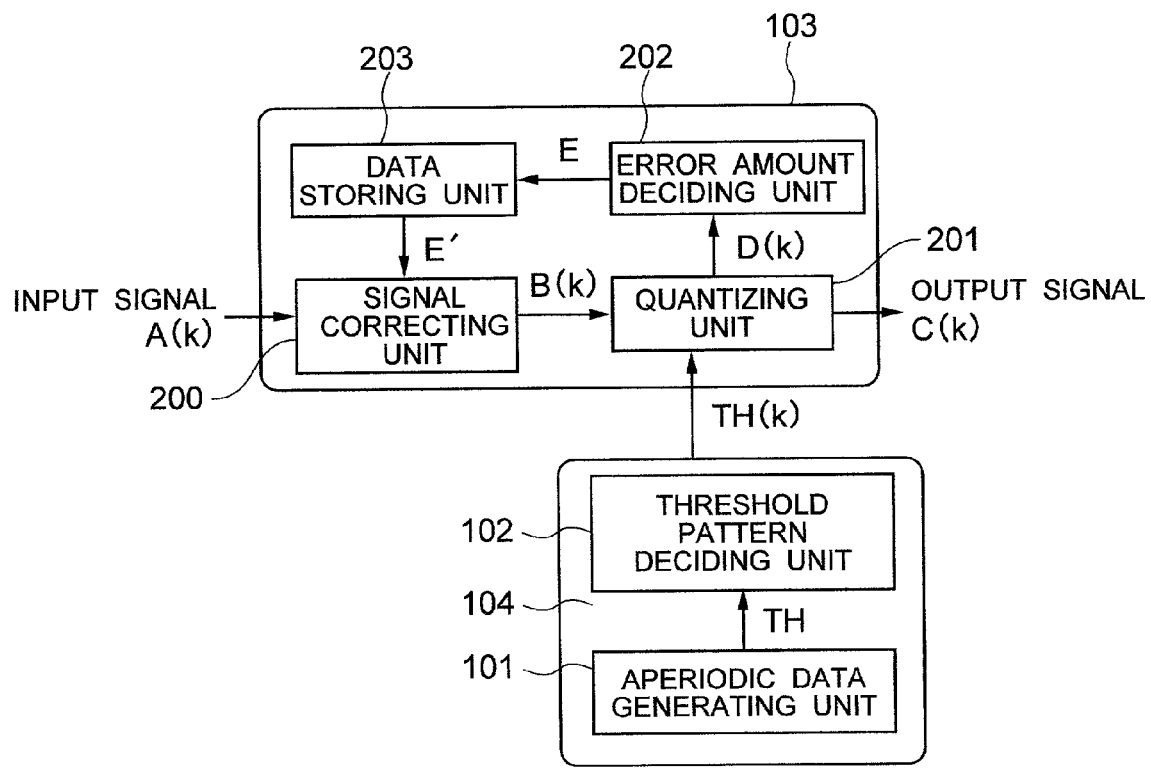
FIG. 2 is a block diagram showing a detailed construction of the first embodiment.

FIG. 2 shows details of the plural-pixel gradation converting unit. First, the aperiodic data generating unit 101 will be explained. In the aperiodic data TH generated by the aperiodic data generating unit 101, there is no periodicity among the generated data (among THa, THb, and THc in FIG. 13). Since it is difficult to generate the data which does not include periodicity at all, pseudo aperiodic data which can be easily formed can be also used. As a method of forming the aperiodic data TH, there are various methods such as method of generating simple random numbers such as middle-square method or linear congruencies method, method using a normal distribution, and the like. However, the forming method is not limited to them so long as a certain degree of aperiodicity can be held among the generated data.

Figures 12, 13:
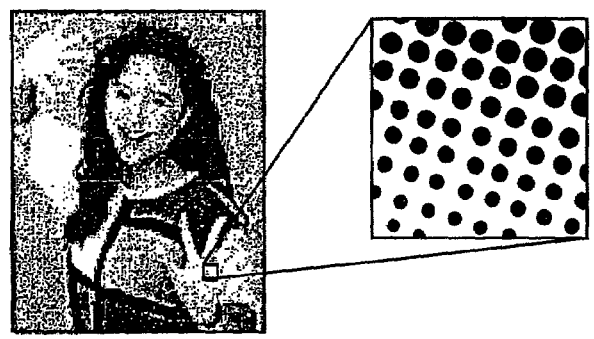
FIG. 12 is an explanatory diagram showing a period of a density pattern included in a printed matter.
FIG. 13 is an explanatory diagram showing relations among pixels, pixel areas, and threshold values.

FIG. 13 shows a relation between pixels and pixel areas and a threshold value deciding method. A (x, y) indicates an address of the pixel. A (i, j) indicates an address of the pixel area in the case where four pixels are set to the pixel area. Among the pixel areas corresponding to the pixel areas of (i, j)=(0, 0), (0, 1), and (0, 2), THa, THb, and THc denote the aperiodic data. With respect to the threshold values in the pixel area, for example, the aperiodic data THa in the pixel area of (i, j)=(0, 0) is converted into a threshold value such that dots are generated in the pixel area by (x, y)=(0, 0)→(0, 1)→(1, 0)→(1, 1) due to a decrease in luminance value (black→white) of the image signal or an increase in density value (white→black).

The relation between the generation of the dots and the threshold values will be specifically explained hereinbelow. For simplicity of explanation, it will be described by using a quantizing method of deciding ON/OFF of the dots by comparing the image signal with the threshold values.

The pixel area is a local area of an image. Since the image signal in one pixel area has a similar luminance value or density value, a structure of the dot in the pixel area which is formed by the quantization can be defined by the setting of the threshold value of each pixel in the pixel area. For example, assuming that the threshold values corresponding to the pixels (x, y)=(0, 0), (0, 1), (1, 0), (1, 1) in the pixel area are set to THa/4, 2THa/4, 3THa/4, and THa, respectively, it is possible to obtain a quantization result such that when the density value of the image signal in the pixel area is equal to or larger than THa/4 and is less than 2THa/4, one pixel of (0, 0) is set to the dot-ON state, when all of the density values of the image signal in the pixel area is equal to or larger than 2THa/4 and is less than 3THa/4, two pixels of (0, 0) and (0, 1) are set to the dot-ON state, when the density value of the image signal in the pixel area is equal to or larger than 3THa/4 and is less than THa, three pixels of (0, 0), (0, 1), and (1, 0) are set to the dot-ON state, and when the density value of the image signal in the pixel area is equal to or larger than THa, all of the pixels in the pixel area are set to the dot-ON state, respectively.

This example shows a threshold value array in which the dots in the pixel area are formed in order of (0, 0)→(0, 1)→(1, 0)→(1, 1) so as to systematically surround the center of the pixel area (hereinafter, referred to as dot concentration) as the density of the image signal in the pixel area increases.

According to another example, assuming that the threshold values of the pixels in the pixel area are set to 2THa/4, 2THa/4, THa, and THa, respectively, the dots in which two vertical pixels are interlocked can also concentrate systematically at two stages in a manner such that when the density value of the image signal in the pixel area is equal to or larger than 2THa/4 and is less than THa, two pixels of (0, 0) and (0, 1) are set to the dot-ON state and, when the density value of the image signal in the pixel area is equal to or larger than THa, four pixels of (0, 0), (0, 1), (1, 0), and (1, 1) are set to the dot-ON state, respectively.

By using the array of the threshold values as mentioned above, the quantization in which the generation of the isolated dots has been suppressed can be performed, and the dots which are optimum to print by the printer in the pixel area can be formed. Since a shape of the dot which is optimum to print by the printer largely depend on printing characteristics of the printer, the array of the threshold values is not limited to the above example so long as the dots are systematically formed in the quantization in the pixel area.

Upon setting of the threshold values, the threshold value of each pixel in the pixel area corresponding to each aperiodic data such as THa/4, 2THa/4, 3THa/4, or THa is obtained from available values of the aperiodic data, and the relation between the input and output is prepared as a table.

Figures 14, 15:
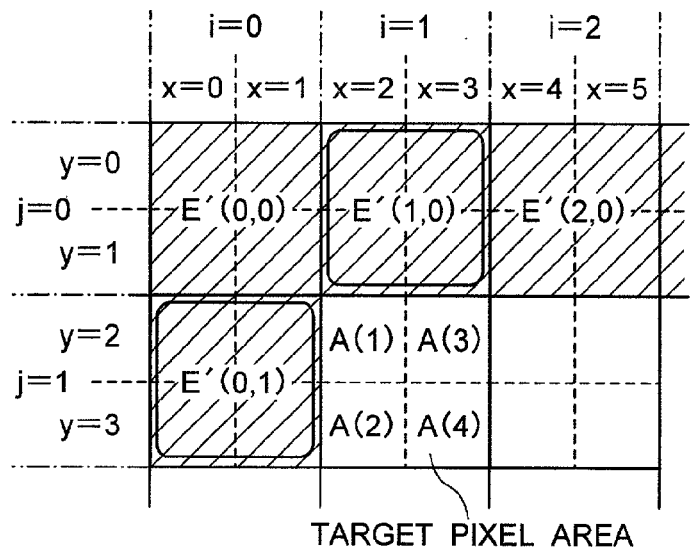
FIG. 14 is an explanatory diagram showing a propagating method of quantization errors in the pixel areas.
FIG. 15 is a constructional diagram of a table which is used in a threshold pattern deciding unit.

FIG. 15 shows a table which is used in the threshold pattern deciding unit. The threshold values to be set can be also obtained with reference to the table without calculating the threshold value corresponding to each pixel in the pixel area from the aperiodic data.

However, if a range of the data which is generated from the aperiodic data generating unit 101 differs from a range of the available data of the input signal (for example, 16 bits of the aperiodic data, 8 bits of the input signal), it is impossible to compare with the input signal. Therefore, a process of changing the data range of the aperiodic data to the data range of the input signal is executed by using a bit shifting process or the like before and after the timing of deciding the threshold pattern.

The plural-pixel gradation converting unit 103 will now be described. The plural-pixel gradation converting unit 103 executes a gradation conversion of each pixel by using the threshold values from the threshold pattern deciding unit 102. The plural-pixel gradation converting unit 103 will be specifically explained with reference to FIG. 2.

The plural-pixel gradation converting unit 103 comprises: a signal correcting unit 200 for executing a signal correction of each pixel to input signals A(1) to A(n) of the pixels in the pixel area and outputting correction data B(1) to B(n); a quantizing unit 201 for comparing the correction data B(1) to B(n) with the threshold values TH(1) to TH(n) from the threshold pattern deciding unit 102, quantizing them to output signals C(1) to C(n), and further, outputting quantization errors D(1) to D(n) of the pixels which are caused by the quantization, respectively; an error amount deciding unit 202 for calculating a quantization error E in the pixel area from the quantization errors D(1) to D(n) of the pixels in the pixel area from the quantizing unit 201 and outputting it; and a data storing unit 203 for temporarily storing the quantization error E in the pixel area from the error amount deciding unit 202 and outputting a quantization error E' in the pixel area requested by the signal correcting unit 200. The signal correcting unit 200, quantizing unit 201, error amount deciding unit 202, and data storing unit 203 will be specifically explained hereinbelow.

By using the quantization error E' generated in the pixel area where the quantizing process has been performed, the signal correcting unit 200 corrects the input signals A(1) to A(n) in the pixel area where the quantizing process is not performed, respectively, thereby obtaining B(1) to B(n).

FIG. 14 shows a signal correcting method, wherein (i, j)=(0, 0), (1, 0), (2, 0), . . . , (0, 1) denote pixel areas to which the quantizing process has been finished. Each of E'(0, 0), E'(1, 0), E'(2, 0), . . . , E'(0, 1) denotes the error E' in the pixel area which is caused by the quantization in each pixel area. The errors E' in the pixel areas have been accumulated in the data storing unit 203. A method of forming the errors E' in the pixel areas will be described in the error amount deciding unit 202.

A method of obtaining B(1) to B(4) by correcting the signals A(1) to A(n) of the pixels in the pixel area (i, j)=(1, 1) is shown in the following equation (1)

$$B(k)=A(k)+e \qquad (1)$$

$$e=(E'(1, 0)*P1+E'(0, 1)*P2)/n$$

$$P1+P2=1.0$$

n=the number of pixels in the pixel area k=(1 to n)

where, e: error amount which is added to each pixel in the pixel area n: the number of pixels in the pixel area P1, P2: error coefficients for deciding at which distribution ratio the quantization errors from the pixel areas at two positions are used As mentioned above, the quantization errors in the pixel areas which are caused by the quantizing process are propagated to the signals of the pixel areas where the quantizing process is not performed, thereby enabling gradations of the input signal to be held. In the expression (1), the quantization errors in the pixel areas which are used have been set to two positions. However, for example, quantization errors in the pixel areas in a wide range such as E'(0, 0), E'(1, 0), E'(0, 1), and E'(2, 0) can be also used. Since the setting of the number of pixel areas and the error coefficients which are used in the signal correction needs to be changed in accordance with target picture quality, it is not limited.

The quantizing unit 201 compares the threshold values TH(1) to TH(n) corresponding to the pixels in the pixel areas from the threshold pattern deciding unit 102 with the correction data B(1) to B(n) of the pixels in the pixel areas from the signal correcting unit 200, thereby quantizing them to the output signals C(1) to C(n), respectively. The quantizing unit 201 also outputs the quantization errors D(1) to D(n) of the pixels which are caused by the quantization to the error amount deciding unit 202, respectively. For example, in case of gradation converting the input signal A(n) of 8 bits (0 to 255) into the output signal C(n) of one bit (0 or 1), a method of obtaining C(n) and D(n) from B(n) is as shown in the following expression (2).

$$IF(B(k)>TH(k))\{C(k)=1;D(k)=B(k)-255\}$$

$$ELSE\{C(k)=0;D(k)=B(k)\} \qquad (2)$$

where, n: the number of pixels in the pixel area k: (0 to n)

Figures 16, 17:
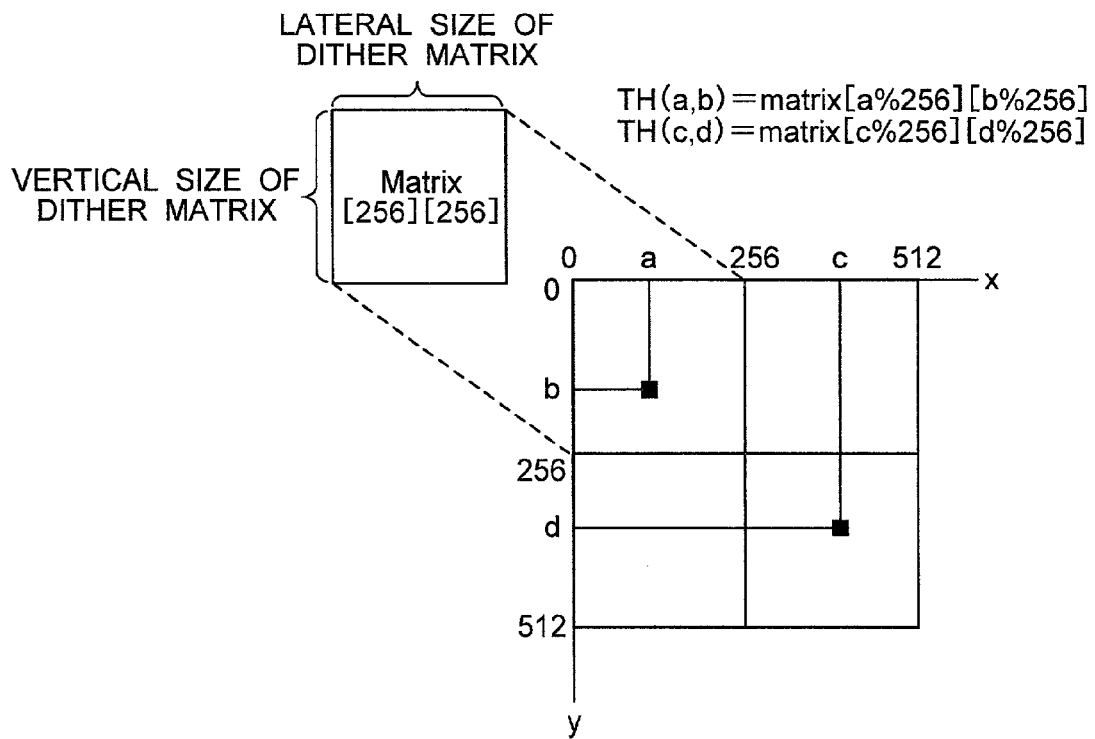
FIG. 16 is an explanatory diagram showing an image signal, threshold values, quantization results, and quantization errors.
FIG. 17 is an explanatory diagram showing a correspondence between pixel addresses of image data and threshold values of a dither matrix.

FIG. 16 shows data in each portion of the plural-pixel gradation converting unit. (a) shows the data in the case where the number of pixels of the pixel area is equal to 4. (b) shows the threshold value allocated to each pixel. (c) shows the data quantized by the threshold value. (d) shows an example of the quantization error of each pixel. The expression (2) will be described with respect to B(1) and B(3) as examples.

Since B(1) (=120) is larger than the threshold value TH(1) (=50), it is quantized to a 1-bit signal 1 corresponding to 255 by the 8-bit signal. However, since B(1) (=120) is not equivalent to 255, the quantization error D(1) (=−135) caused upon quantization can be obtained by B(1)−255.

Since B(3) (=126) is smaller than the threshold value TH(3) (=150), it is quantized to a 1-bit signal 0 corresponding to 0 by the 8-bit signal. However, since B(3) (=126) is not equivalent to 0, the quantization error D(3) (=126) caused upon quantization can be obtained by B(3)−0.

The quantization of each pixel in the pixel area is performed by the above method and, further, the quantization error of each pixel caused by the quantization can be formed.

The error amount deciding unit 202 will now be described. The error amount deciding unit 202 obtains the quantization error E in the pixel area from the quantization errors D(1) to D(n) caused by the quantization of each pixel in the pixel area on a pixel area unit basis. The quantization error E in the pixel area can be obtained by the following expression (3).

$$E=\Sigma D(k) \qquad (3)$$

where, k: 1 to n

According to the expression (3), a result indicative of the sum of the quantization errors D(1) to D(n) caused by the quantization of each pixel in the pixel area is set to the quantization error E in the pixel area. To use the result obtained by the expression (3) in the signal correcting unit 200, it is outputted to the data storing unit 203.

The data storing unit 203 will now be described. The data storing unit 203 successively stores the quantization error E in the pixel area from the error amount deciding unit 202. The data storing unit 203 also outputs the quantization error E' in the pixel area which is used for the signal correction by the signal correcting unit 200.

By the above construction, the image formation apparatus of the embodiment executes the gradation conversion to the input signals A(1) to A(n) of the pixels in the pixel area and can output the output signals C(1) to C(n)

The calculating methods in the signal correcting unit 200 and error amount deciding unit 202 are not limited to the expressions (1) and (3).

Similar results can be also obtained by changing a partial charge of calculations of the respective units by parameters such as coefficients which are used in each unit. For example, assuming that P1 and P2 in the expression (1) which is used in the signal correcting unit 200 are set to 0.5, respectively, the similar B(n) can be formed even by using results of the following expressions (4) and (5), so that an amount of calculations can be reduced.

$$E = 0.5 * \Sigma D(k) \quad (4)$$

$$B(k) = A(k) + e \quad (5)$$

$$e = (E'(1, 0) + E'(0, 1))/n$$

where, n: the number of pixels in the pixel area
k: 0 to n

FIGS. 8A and 8B show the propagating method of the quantization errors in the pixel area of the gradation conversion system. The plural-pixel gradation converting unit 103 mentioned above is based on a mean error minimizing method shown in FIG. 8A. The errors [1] to [4] of the pixel areas which are caused by the quantization are once stored and, when the quantization of the pixel area existing at a position X is executed, a value of the sum of the errors [1] to [4] is used, thereby averagely reducing the quantization errors caused in the peripheral pixel areas and applying to the gradation conversion in the pixel area.

According to an error diffusing method shown in FIG. 8B, the quantization error amount of the pixel area (position of X) determined by the error amount deciding unit 202 is stored into the data storing unit 203 in a form such that it has previously been distributed to the pixel areas [1] to [4] to be corrected. A similar result can be also obtained by applying such an error diffusing method to the gradation conversion. A feedback method of the quantization error of the pixel area is not limited to the above method, but any method can be used so long as the foregoing gradation conversion result can be obtained.

The functions of the image formation apparatus 100 described above can be also realized by software. Software processes similar to the image formation apparatus 100 can be also executed by a processor such as a microcomputer. A method of realizing the functions of the image formation apparatus 100 of the invention by the software processes will be described hereinbelow.

FIGS. 9A and 9B are flowcharts showing a processing method of the information processing control apparatus 700. FIG. 9A shows an example in the case where the mean error minimizing method is applied to the error propagation of the pixel area. FIG. 9B shows an example in the case where the error diffusing method is applied to the error propagation of the pixel area. First, the mean error minimizing method will be explained.

The signal A(n) of the pixels in one pixel area is inputted (9001). After that, the error amount E' generated by the quantization of the peripheral pixel areas is collected from the data storing unit such as hard disk or memory at a ratio of the error coefficients P1 and P2 and the data e which is added to each pixel of A(n) is obtained (9002). The data e is added to the input signal A(n) and the signal B(n) is outputted (9003).

Subsequently, the data TH which is aperiodic between the pixel areas is generated (9004). The aperiodic data is converted into the threshold value TH(n) of each pixel such as to induce the generation of the dots (9005). The signal B is compared with the threshold values of the pixels, thereby quantizing it and obtaining the quantization value C(n) of each pixel in the pixel area (9006). Further, the quantization error D(n) of each pixel caused by the quantization is obtained (9007). The quantization errors D(n) of the pixels are collected, thereby obtaining the error E in the pixel area (9008). The quantization error E is stored in the data storing unit (9009). The above processes are executed every pixel area until the image data is finished.

Subsequently, a case of performing the gradation conversion of the pixel area by using the error diffusing method in the pixel area will be described. The signal A(n) of the pixels in one pixel area is inputted (9011). After that, the error E' accumulated in the data area showing the position of the pixel area as a quantization target in the data storing unit is converted into the error e which is added to each pixel (9012). The error e is added to the input signal A(n) and B(n) is outputted (9013).

Subsequently, the data TH which is aperiodic between the pixel areas is generated (9014). The aperiodic data is converted into the threshold value TH(n) of each pixel such as to induce the generation of the dots (9015). The signal B is compared with the threshold values of the pixels, thereby quantizing it and obtaining the quantization value C(n) of each pixel in the pixel area (9016).

Further, the quantization error D(n) of each pixel caused by the quantization is obtained (9017). The error E in the pixel area is obtained from the quantization error D(n) of each pixel, and errors E1 and E2 to the pixel areas in which the error E is used are determined by using the error coefficients P1 and P2 (9018). The errors E1 and E2 are added to the data area showing the position of the pixel area in the data storing unit (9019). The above processes are executed every pixel area until the image data is finished.

According to the image formation apparatus of the embodiment as described above, in the image formation apparatus for converting the image data including the periodicity into the data in the print format of the printer of an electronic photographic system, the threshold data to form the dot array which is systematic in the pixel area comprising a plurality of pixels having the interlocking relation is formed from the data which is aperiodic between the pixel areas, so that the generation of the moire between the pixel areas is suppressed and the gradation conversion having the systematic dot array such as dot concentration or the like in the pixel area can be obtained.

The propagating process of propagating the quantization error caused by the comparison of the image data and the threshold data to the image data is executed on a pixel area unit basis for forming the systematic dot array. Thus, as compared with the case of performing the propagating process on a pixel unit basis, the signal processing amount can be reduced and the data capacity which is used for accumulating the quantization errors can be also reduced. Further, the moire which is caused in the gradation converting process based only on the threshold value comparison and the isolated dots which are caused in the error propagation of the pixel unit can be suppressed.

(Second Embodiment)

Explanation will now be made with respect to the case where the data generated from the aperiodic data generating unit 101 of the image formation apparatus described in the first embodiment is set to the threshold values of the dither matrix which is used in the blue noise masking method.

Figure 3:
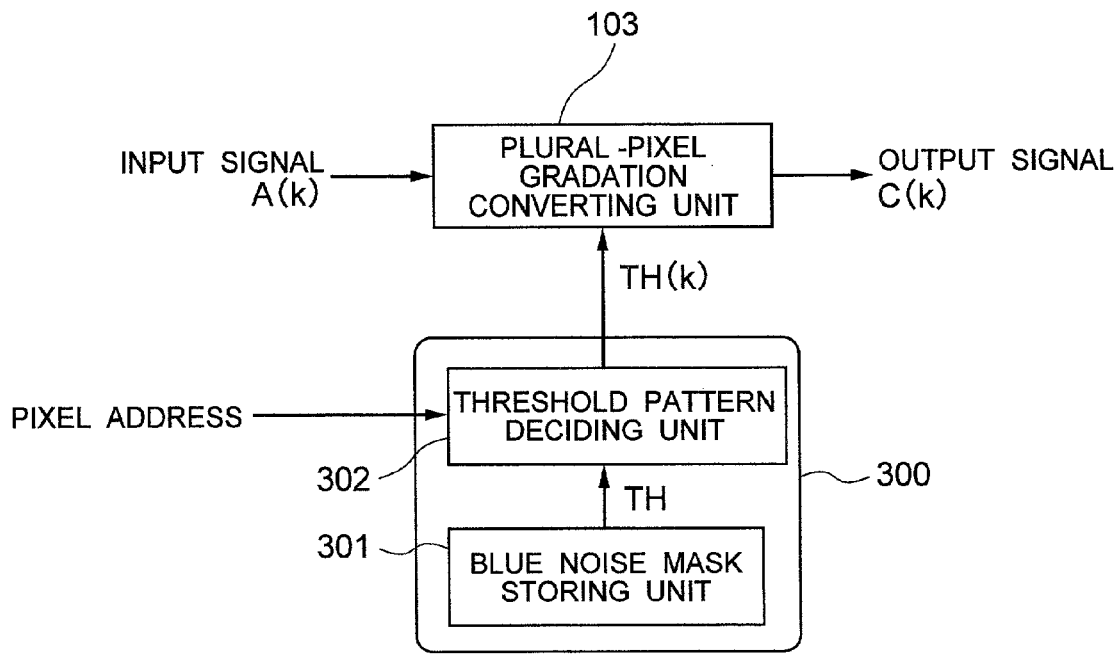
FIG. 3 is a block diagram showing an image formation apparatus of a second embodiment.

FIG. 3 shows a construction of an image formation apparatus according to a second embodiment. Since only the portion for generating the threshold values differs from that of the first embodiment, a portion different from the image formation apparatus in FIGS. 1 and 2, that is, only a threshold value generating unit 300 will be described.

The threshold value generating unit 300 comprises: a blue noise mask storing unit 301 for storing a dither matrix (hereinafter, referred to as a blue noise mask) which is used in the blue noise masking method; and a threshold pattern deciding unit 302.

The blue noise is a noise which does not have any low frequency components but constructed by high frequency components. A dot ON/OFF pattern which is formed by the threshold value comparison of the blue noise mask is aperiodic and radially symmetric. On frequency characteristics, a power spectrum of a low frequency is small and a power spectrum of an image concentrates on a high frequency range. It is derived by an analysis at a spatial frequency of the dot ON/OFF pattern which is formed by the conventional error diffusing method described above.

An example of quantization using the blue noise mask will be explained with reference to FIG. 17. As a blue noise mask, in order to suppress the generation of periodicity, a mask of a size (in the example of FIG. 17, 256×256 pixels) which is relatively larger than that of the dither matrix used in the foregoing dot concentrated type or dot distributed type is used. When the pixel size of the image data is equal to or larger than the size of blue noise mask, one blue noise mask is allocated like a tile as shown in the diagram and a threshold value of the blue noise mask corresponding to each pixel is determined.

For example, when a pixel address of the image data is equal to (a, b) (0≦a<256, 0≦b<256), a threshold value TH(a, b) of the corresponding blue noise mask is equal to matrix [a] [b] (=matrix [a%256] [b%256]). When the pixel address is equal to (c, d) (256≦a<512, 256≦b<512), a threshold value TH(c, d) is equal to matrix [c−256] [d−256] (=matrix [c%256] [d%256]). As mentioned above, the threshold value of the blue noise mask corresponding to the address of the image data is compared, thereby performing the quantization.

The reason why the blue noise mask having such a feature is used for quantization of the pixel area is because there is an effect of suppressing the moire of the image signal in a manner similar to the case of the aperiodic data described in the first embodiment. Further, this is because factors of the deterioration in picture quality containing many low frequency components such as chain-like texture that is generated by the propagating process of the quantization error and fingerprint-like texture that is generated by a specific gradation value are suppressed by the blue noise effect.

However, if the blue noise mask is quantized as it is in correspondence to the image signal, the isolated dots having the power spectrum of the high frequency are generated as mentioned above. Therefore, threshold values for forming a systematic dot array such that it has high frequency components between the pixel areas and the dots concentrate in the pixel area are generated by the threshold value generating unit 300. The operation of the threshold value generating unit 300 will be specifically explained hereinbelow.

The blue noise mask as mentioned above has been stored in the blue noise mask storing unit 301. The threshold pattern deciding unit 302 obtains the threshold value of the blue noise mask to be allocated to one pixel area from the pixel address of the image data or the address of the pixel area from the blue noise mask storing unit 301. Specifically speaking, assuming that the size of blue noise mask is equal to (M×N) numbers of pixels (matrix [M] [N]), the pixel address of the image data is equal to (a, b), and the number of pixels of the pixel area is equal to (1×m) numbers of pixels, the threshold value of the blue noise mask to be allocated to the pixel area can be obtained by the following expression (6).

$$TH=matrix[(a/l)\%M][(b/m)\%N] \quad (6)$$

The threshold value corresponding to one pixel area obtained as mentioned above is converted into the threshold value of each pixel in the pixel area in a manner similar to the threshold pattern deciding method described in the first embodiment.

As described above, by using the blue noise mask as a threshold value of the pixel area comprising a plurality of pixels which enables the control of the generation pattern of the dots such as generating order of the dots or generating positions of the dots, the generation of the moire between the pixel areas can be suppressed.

The threshold value of each pixel in the pixel area is converted into a threshold value in which the dots concentrate systematically by using the threshold value of the blue noise mask. The quantization of each pixel in the pixel area is performed by using the converted threshold value, and a quantization result is outputted. Further, the propagating process of propagating the quantization error caused by the quantization to the image signal is executed on a pixel area unit basis.

By executing such a gradation conversion, the systematic dot array such as dot concentration is formed in the pixel area, while the data in the print format in which the generation of the moire is suppressed owing to the effect of the blue noise can be formed between the pixel areas.

The propagating process of propagating the quantization error caused by the comparison of the image data and the threshold data to the image data is executed on a pixel area unit basis, so that the moire caused by the gradation converting process based only on the threshold value comparison and the isolated dots which are generated by the error propagating process of the pixel unit can be suppressed. Further, as compared with the case of executing the propagating process on a pixel unit basis, the signal processing amount can be reduced and the data capacity which is used for accumulation of the quantization errors can be reduced.

The foregoing factors of the deterioration in picture quality containing many low frequency components such as chain-like texture that is generated by the propagating process of the quantization error and fingerprint-like texture that is generated by a specific gradation value can be also reduced by the blue noise effect.

The functions of the image formation apparatus of the invention can be also realized by software processes in a manner similar to the first embodiment. In this case, it is sufficient that steps 9004 and 9014 of generating the aperiodic data in FIGS. 9A and 9B are replaced with the determination of the threshold value position of the blue noise mask and the obtainment of the threshold value from the blue noise mask.

(Third Embodiment)

Explanation will now be made with respect to the third embodiment in which a dither matrix obtained from the threshold values which are generated by the threshold value generating unit 300 of the image formation apparatus described in the second embodiment is used for gradation conversion of the image data.

Figure 4:
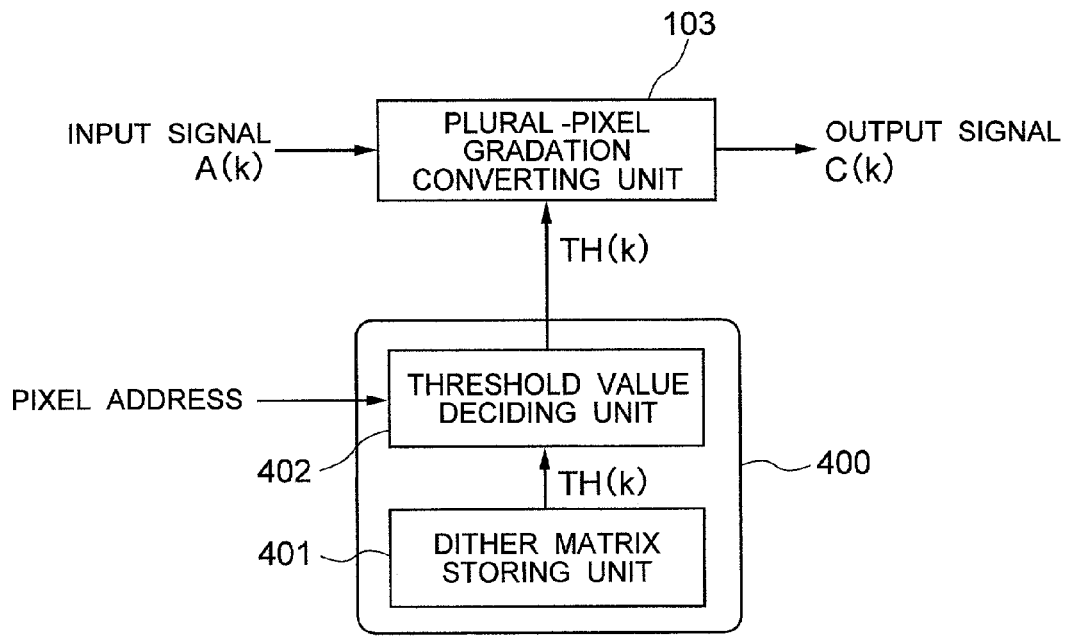
FIG. 4 is a block diagram showing an image formation apparatus of a third embodiment.

FIG. 4 shows an image formation apparatus according to the third embodiment. Since only a portion for generating the threshold values differs from FIG. 3, the portion different from the image formation apparatus in the embodiment 2, that is, only a threshold value generating unit 400 will be described.

The threshold value generating unit 400 is constructed by: a dither matrix storing unit 401 for forming a dither matrix from the threshold values generated by the threshold value generating unit 300 in the second embodiment (hereinafter, such a dither matrix is referred to as a dot control type blue noise mask) and storing the dot control type blue noise mask; and a threshold value deciding unit 402 for extracting the threshold value of the dot control type blue noise mask corresponding to the pixel address of the image data from the dither matrix storing unit 401 and outputting it to the plural-pixel gradation converting unit 103.

Figure 18:
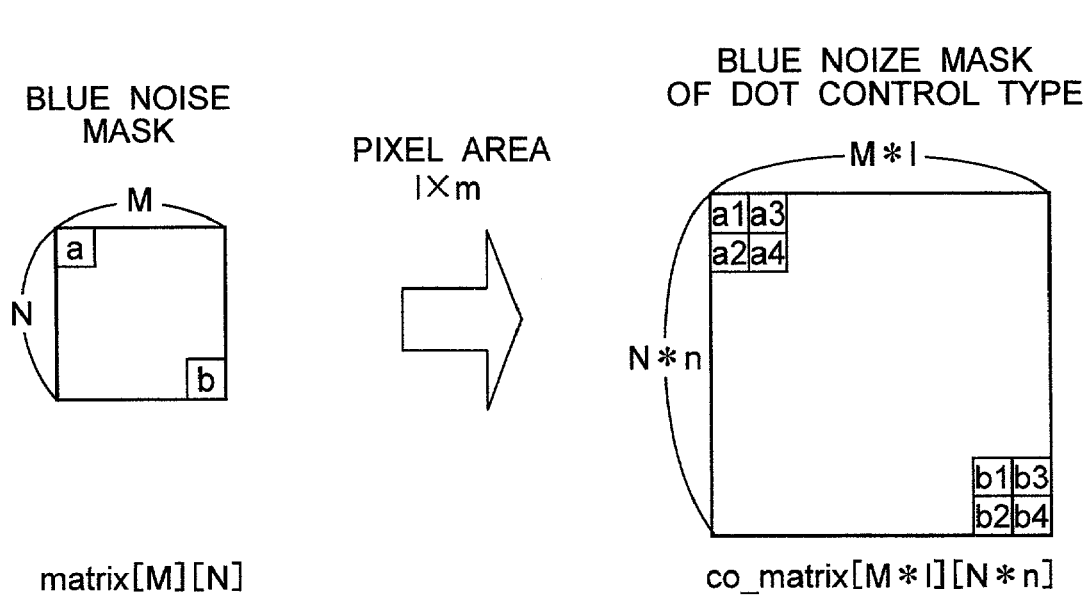
FIG. 18 is an explanatory diagram showing a method of forming a dither matrix having a threshold value of each pixel in the pixel area from the blue noise mask.

FIG. 18 shows an example in the case where the blue noise mask is converted into a dot control type blue noise mask. It is a dot control type blue noise mask in the case where a blue noise mask of (M×N) numbers of pixels is converted into a mask of the pixel area of (m×n) numbers of pixels. Since the pixel area is constructed by (1×n) number of pixels, a pixel size of the dot control type blue noise mask is equal to (m·M×n·N). If the threshold value deciding pattern in case of the pixel area of (2×2) numbers of pixels described in the first embodiment is used, when the threshold value of matrix [0] [0] of the blue noise mask is assumed to be a, co_matrix [0] [0] of the dot control type blue noise mask is equal to a/4. Likewise, co_matrix [0] [1] is equal to a/2, co_matrix [1] [0] is equal to 3a/4, and co_matrix [1] [1] is equal to a, respectively. If the threshold value of matrix [M] [N] is assumed to be b, co_matrix [m·M] [n·N] of the dot control type blue noise mask is equal to b/4. Likewise, co_matrix [m·M] [n·N+1] is equal to b/2, co_matrix [m·M+1] [n·N] is equal to 3b/4, and co_matrix [m·M+1] [n·N+1] is equal to b, respectively.

Figure 19:
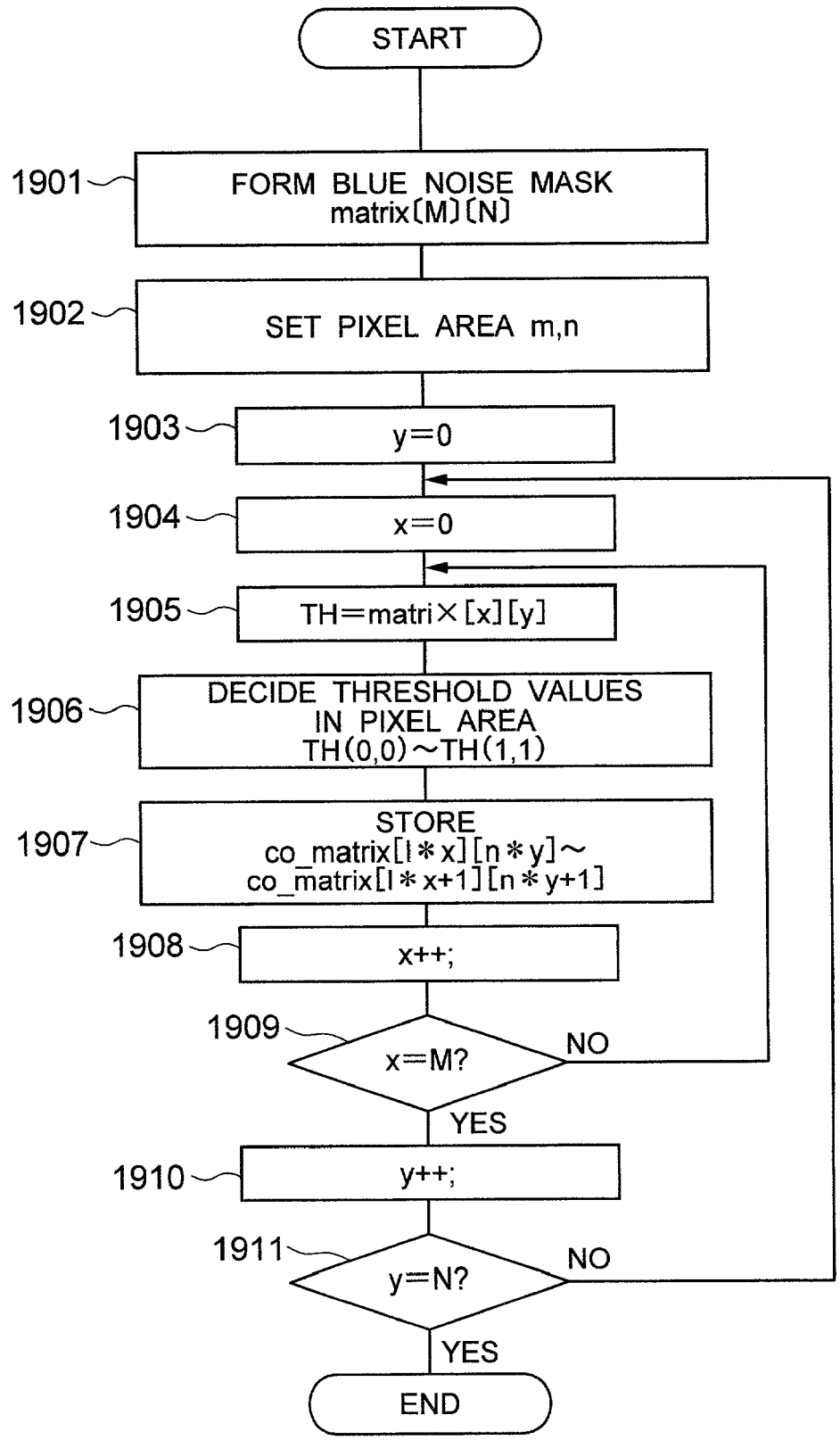
FIG. 19 is a flowchart for forming a dither matrix having a threshold value of each pixel in the pixel area from the blue noise mask.

FIG. 19 is a flowchart for a forming method of the dot control type blue noise mask. First, a blue noise mask matrix [x] [y] of the size of (x×y) pixels is formed (1901). Subsequently, a size (m, n) of the pixel area is determined (1902). Initial setting of a y axis is performed (1903) and initial setting of an x axis is performed (1904). Subsequently, the threshold value TH of the blue noise mask matrix [x] [y] is extracted (1905). The threshold value is converted into threshold patterns TH(0, 0) to TH(1, 1) in the pixel area by using TH (1906). The threshold patterns TH(0, 0) to TH(1, 1) are stored into the dot control type blue noise masks co_marix [m*x] [n*y] to co_marix [m*x+1] [n*y+1] (1907). Subsequently, the x axis is counted (1908), thereby discriminating a termination of the x axis (1909). Subsequently, the y axis is counted (1910), thereby discriminating a termination of the y axis (1911). By executing the above processes with respect to all threshold values of the blue noise mask matrix [x] [y], the dot control type blue noise mask of the pixel size (m·M×n·N) can be formed.

The dot control type blue noise mask formed by the above procedure can be also registered as initial setting of the image formation apparatus into the RAM or ROM as shown in FIGS. 7A and 7B.

According to the third embodiment as described above, the dither matrix which has been formed from the blue noise mask and corresponds to each pixel in the pixel area is used for quantization of each pixel in the pixel area, and the quantization result is outputted. Further, the quantization error in the pixel area which is caused by the quantization is propagated to other pixel areas which are not quantized.

By executing such a gradation conversion, although the size of dither matrix becomes larger than that of the blue noise mask disclosed in the second embodiment, since it is unnecessary that the threshold value which is made to correspond to each pixel in the pixel area is formed every pixel area, the process can be executed at a high speed.

Owing to the effect of the blue noise, the generation of the moire between the pixel areas is suppressed and the data in the print format having the systematic dot array such as dot concentration or the like can be formed in the pixel area.

The propagating process of propagating the quantization error caused by the comparison of the image data and the threshold data to the image data is executed on a pixel area unit basis. Thus, the moire which is caused by the gradation converting process based only on the threshold value comparison, and the isolated dots which are generated by the error propagating process of the pixel unit can be suppressed. Further, as compared with the case of performing the propagating process on a pixel unit basis, an amount of signal processes can be reduced and a data capacity which is used for accumulating the quantization errors can be also reduced.

The foregoing factors of the deterioration in picture quality containing many low frequency components such as chain-like texture that is generated by the propagating process of the quantization error and fingerprint-like texture that is generated by a specific gradation value can be also reduced by the blue noise effect.

The functions of the image formation apparatus of the invention can be also realized by software processes in a manner similar to the first embodiment. In this case, steps 9004 and 9014 of generating the aperiodic data in FIGS. 9A and 9B can be realized by replacing them with the determination of the threshold value position of the dot control matrix and the obtainment of the threshold value from the dot control matrix, respectively.

(Fourth Embodiment)

The first to third embodiments have been described with respect to the cases of handling a black and white image. In the fourth embodiment, explanation will be made with respect to the case of applying the image formation apparatus shown in each of the first to third embodiments to a gradation conversion of a color image.

FIG. 20 is a constructional diagram of an image formation apparatus in which the gradation conversion of the color image is performed. Fundamentally, since the gradation conversion is independently executed every color, the processes of the pluralpixel gradation converting unit 103 described in the first to third embodiments are executed the number of times corresponding to the number of colors. With respect to the plural-pixel gradation converting unit 103, plural-pixel gradation converting units of the number as many as the number of colors can be provided in parallel as shown in FIG. 20, or the plural-pixel gradation converting unit 103 corresponding to one color can also sequentially execute the gradation conversion the number of times corresponding to the number of colors. In the embodiment, a threshold value control unit 2002 for allocating threshold values generated from a threshold value generating unit 2001 to the plural-pixel gradation converting units 103 corresponding to the respective colors is provided. Since the threshold value generating unit described in the first to third embodiments can be used as a threshold value generating unit 2001, the threshold value control unit 2002 will be specifically described hereinbelow.

With respect to image signals R(k), B(k), and G(k) (where, k=1 to n) of the pixel areas of the respective colors each of which is constructed by n pixels, the gradation conversion of the pixel area is independently executed as described in the first and third embodiments, and signals R'(k), B'(k), and G'(k) obtained after the gradation conversion are outputted. However, with respect to the threshold value which is used for quantization of each pixel, it is necessary to allocate the threshold values from the threshold value generating unit 2001 to the threshold value of each color by the threshold value control unit 2002.

FIGS. 21A and 21B show constructions of the threshold value control unit 2002. The threshold value control unit 2002 controls the threshold value generating unit 2001. For example, as shown in FIG. 21A, the threshold value control unit 2002 makes a threshold value control for allowing the threshold value generating unit 2001 to generate threshold values TH(k) (where, k=1 to n) corresponding to the respective pixels in the pixel area on a pixel area unit basis and allocate similar threshold values TH(k) THR(k)=THG(k)=THB(k) (where, k=1 to n) to the images of the respective colors.

Or, as shown in FIG. 21B, the threshold value control unit 2002 makes a threshold value control for allowing the threshold value generating unit 2001 to generate the threshold values THR(k), THG(k), and THB(k)(where, k=1 to n) in the pixel areas of each pixel area unit and each color unit and allocate different threshold values THR(k), THG(k), and THB(k) (where, k=1 to n) to the respective images of the respective colors.

Figure 6:
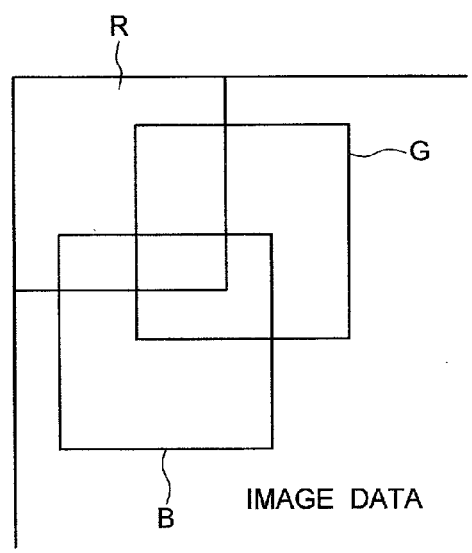
FIG. 6 is an explanatory diagram showing a method of shifting a phase of a dither matrix.

As an example of a method of allocating the different threshold values, such allocation can be realized by a method whereby dither matrices in which threshold value arrays of three colors are different is applied in case of using the dither matrix in the threshold value generating unit described in the second and third embodiments, a method whereby the position where the dither matrix is applied to the image data is shifted every color by using the dither matrix of one color as shown in FIG. 6, or the like.

As described above, the image formation apparatus of the invention can be also applied to the gradation conversion of the color image.

(Fifth Embodiment)

Figure 5:
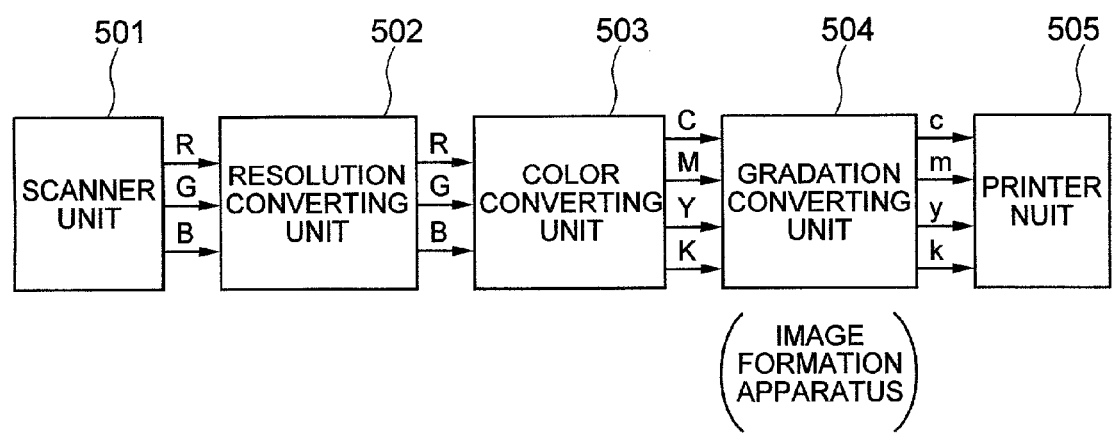
FIG. 5 is a block diagram of a copying apparatus to which the image formation apparatus of the invention is applied.

The fifth embodiment in which the image formation apparatus of the invention is applied to a copying apparatus will now be described. The apparatus of FIG. 5 is constructed by: a scanner unit 501 for reading a copied matter and converting a read-out image into image data; a resolution converting unit 502 for changing a size of image data in accordance with a request from the user or print resolution of the printer unit; a color converting unit 503 for converting image signals of three colors of R, G, and B which are inputted into chrominance signals of toner of the printer, respectively; a gradation converting unit 504 for converting the number of gradations of each chrominance signal into the number of gradations which can be printed by the printer; and a printer unit 505 of the electronic photographic system for printing onto a medium such as paper by using a gradation conversion result. The image formation apparatus of the invention is applied to the gradation converting unit 504. Each unit will be specifically explained hereinbelow.

The scanner unit 501 is an apparatus for irradiating light to the copied matter, reading intensity of its reflected light, and forming image data of the copied matter. Although a general scanner forms the image data of 8 bits/color per pixel, in recent years, there is also a scanner for obtaining image data of 8 bits/color or more in order to perform a correcting process to the image data obtained after the reading. The resolution converting unit 502 enlarges or reduces the image data from the scanner unit 501 in consideration of a resizing request from the user for changing the print size from the A3 size to the A4 size, or the like and the print resolution of the printer unit 505. For example, in the case where reading resolution of the scanner is equal to 200 dpi, the resolution of the printer is equal to 400 dpi, and there is not a resizing request from the user, unless each of the portrait and landscape sizes of the image data is enlarged twice, a copy result of the same size as that of the original copied matter cannot be outputted. If there is a resizing request of $\frac{1}{16}$ from the user in a similar apparatus, it is necessary to reduce each of the portrait and landscape sizes of the image data into $\frac{1}{2}$.

As a resolution converting method, although there are various methods such as nearest neighborhood method, bilinear method, and the like, the embodiments are not limited to such methods.

The color converting unit 503 converts the data from the resolution converting unit 502 into the chrominance signals of ink which is used in the printer unit 505. As a color converting method, although there are various methods such as method of using a table obtained by converting color characteristics of the scanner unit 501 and printer unit 505, method of converting by using a matrix arithmetic operation, and the like, the embodiments are not limited to such methods.

The gradation converting unit 504 converts the number of gradations of each color obtained after the color conversion into the number of gradations which can be printed by the printer unit 505, and the image formation apparatus of the invention as described in the fourth embodiment is applied.

In the printer of the electronic photographic system, even if the image data including the isolated dots such that one pixel is a black pixel and eight peripheral pixels are white pixels is supplied, the toner is hard to be stably adhered onto the photosensitive material and the portion of the isolated dot cannot be printed, so that there is a problem such that the gradation of the input data is not reflected to the print result. Therefore, threshold values such that the dots concentrate systematically on the pixel area are set as shown in FIG. 13. Thus, the generation of the isolated dots can be reduced. The moire which is generated due to the periodicity of the density pattern included in the copy target matter can be suppressed by effects obtained by performing the quantization in the pixel area by using the data having the aperiodic nature between the pixel areas and by propagating the error caused due to the quantization in the pixel area to another pixel area which is not quantized.

With respect to the number of gradations which can be printed by the printer unit 505, although there are various gradation numbers like a binary output of 1 bit/pixel, a multivalue output such as 2 bits/pixel or 16 bits/pixel, the image formation apparatus of the invention can also cope with an arbitrary number of print gradations.

Although the first to fourth embodiments have been described with respect to the case where the number of output gradations of the image output apparatus is set to a binary output, it can be also applied to a multivalue output by changing the threshold value by the number of printable gradations. Specifically speaking, a range of the threshold values which are generated by the threshold value generating unit is changed in accordance with the number of output gradations of the image output apparatus. For example, in case of the 8-bit input and the 1-bit output, by setting the range of the threshold values to 0 to 255, the quantization to 0 and 1 (corresponding to 0 and 255 in 8 bits) is performed. In case of the 8-bit input and the 2-bit output, by setting the range of the threshold values to 0 to 85, the quantization to 0, 1, 2, and 3 (corresponding to 0, 85, 170, and 255 in 8 bits) is performed.

With respect to the resolution converting unit 502, color converting unit 503, and gradation converting unit 504 described above, in the information processing control apparatus 70 shown in FIG. 7A, like an image formation apparatus 100, each unit can be also implemented as a hardware circuit into a copying apparatus. On the other hand, like an information processing control apparatus 700 shown in FIG. 7B, each unit can be also implemented into a copying apparatus in which the CPU 701 has the functions of the image formation apparatus 100 as software.

As described above, by applying the image formation apparatus of the invention to the gradation converting unit of the copying apparatus, the data in the print format in which the moire and the generation of the isolated dots are suppressed can be formed, and even in the print result of the printer unit, the gradation which the image data which is obtained before the gradation converting process has can be held. The gradation conversion as mentioned above can be realized at a high speed.

According to the image formation apparatus of the invention, since the threshold data to form the systematic dot array in the pixel area comprising a plurality of interlocked pixels is formed from the data or the like which is aperiodic between the pixel areas, there is an effect such that the data in the print format in which the generation of the moire is suppressed between the pixel areas and which has the systematic dot array such as dot concentration in the pixel area can be obtained.

Since the propagating process of propagating the quantization error caused by the comparison of the image data and the threshold data to the image data is executed on a unit basis of the pixel area for forming the systematic dot array, as compared with the case of executing the propagating process on a pixel unit basis, the signal processing amount can be reduced and the data capacity for use in accumulation of the quantization errors can be also reduced. Further, the moire which is caused due to the gradation converting process based only on the threshold value comparison and the isolated dots which are generated due to the error propagation of the pixel unit can be suppressed.

It should be further understood by those skilled in the art that the foregoing description has been made on embodiments of the invention and that various changes and modifications may be made in the invention without departing from the spirit of the invention and the scope of the appended claims.

What is claimed is:

1. An image formation apparatus for converting image data including periodicity into data in a print format of a printer of an electrophotographic system, comprising:
   aperiodic data generating means for generating aperiodic data between pixel areas having a neighboring relation every pixel area comprising a plurality of pixels having an interlocking relation of said image data;
   threshold value deciding means for converting said aperiodic data into a plurality of threshold data for forming a systematic dot array in said pixel area; and
   gradation conversion processing means for performing a gradation converting process by comparing said image data with said threshold data.

2. An apparatus according to claim 1, wherein said threshold value deciding means has a table showing a relation in which a threshold value of the aperiodic data is set to an input and a threshold value which is made to correspond to each pixel in said pixel area which is formed from said aperiodic data is set to an output.

3. An apparatus according to claim 1, wherein in the case where the aperiodic data is assumed to be TH and the number of pixels in said pixel area is equal to N, the threshold data to form said systematic dot array is determined by the aperiodic data and said number of pixels by assuming that a threshold value which is used for quantization of the first pixel is equal to 1·TH/N, a threshold value which is used for quantization of the second pixel is equal to 2·TH/N, and a threshold value which is used for quantization of the Nth pixel is equal to N·TH/N, respectively.

4. An image formation apparatus for converting image data including periodicity into data in a print format of a printer of an electrophotographic system, comprising:
   a blue noise mask storing unit for storing a blue noise mask;
   threshold value deciding means for allowing each threshold value of said blue noise mask to correspond to each pixel area comprising a plurality of pixels having an interlocking relation of said image data and converting the threshold value of said blue noise mask into a plurality of threshold data for forming a systematic dot array in said pixel area; and
   gradation conversion processing means for performing a gradation converting process by comparing performing a gradation converting process by comparing said image data with said threshold data.

5. An apparatus according to claim 4, wherein said threshold value deciding means has a table showing a relation in which the threshold value of said blue noise mask is set to an input and a threshold value which is made to correspond to each pixel in said pixel area which is formed from the threshold value of said blue noise mask is set to an output.

6. An apparatus according to claim 4, wherein in the case where the threshold value of said blue noise mask is assumed to be TH and the number of threshold values is equal to N, the threshold data to form said systematic dot array is determined by the threshold value of said blue noise mask and said number of threshold values by assuming that a threshold value which is used for quantization of the first pixel is equal to TH/N, a threshold value which is used for quantization of the second pixel is equal to 2·TH/N, and a threshold value which is used for quantization of the Nth pixel is equal to TH, respectively.

7. An apparatus according to claim 1, wherein said gradation conversion processing means comprises:
   quantizing means for converting said image data into print data by comparing said image data with said threshold data;
   correction value deciding means for deciding a quantization error caused by quantization every said pixel area and deciding a correction value for correcting the image data corresponding to the pixel area where a quantizing process is not performed;
   data storing means for accumulating said correction value; and
   data correcting means for correcting the correction value; and
   data correcting means for correcting the image data corresponding to said pixel area where the correction value; and
   data correcting means for correcting the image data corresponding to said pixel area where the quantizing process is not performed by using said accumulated correction value.

8. An apparatus according to claim 7, wherein in the case where the number of pixels in said pixel areas is equal to n and quantization errors of the image data corresponding to the pixel areas are assumed to be E1 to En, said correction value deciding means sets a sum of E1 to En to the quantization error of said pixel areas and decides said correction value as $1/n \cdot \Sigma En$ by said number (n) of pixels.

9. An image formation apparatus for converting image data including periodicity into data in a print format of a printer of an electrophotographic system, comprising:
   gradation conversion processing means for using a dither matrix in which a plurality of threshold value areas each comprising a plurality of threshold data having an interlocking relation are arranged and performing a gradation conversion by comparing said image data with the threshold data of said dither matrix,
   wherein each of said threshold data in said threshold value area is threshold data for forming a systematic dot array in said threshold value area, and the dither matrix in which only the largest threshold data has been extracted in said threshold value area is aperiodic between the threshold data having a neighboring relation.

10. An apparatus according to claim 9, wherein in the case where the aperiodic data is assumed to be TH and the number of threshold data in said threshold value area is equal to N, the threshold data to form said systematic dot array is determined by the aperiodic data and said number of threshold data by assuming that a threshold value which is used for quantization of the first pixel is equal to $1 \cdot TH/N$, a threshold value which is used for quantization of the second pixel is equal to $2 \cdot TH/N$, and a threshold value which is used for quantization of the Nth pixel is equal to $N \cdot TH/N$, respectively.

11. An image formation apparatus for converting image data including periodicity into data in a print format of a printer of an electrophotographic system, comprising:
   gradation conversion processing means for using a dither matrix in which a plurality of threshold value areas each comprising a plurality of threshold data having an interlocking relation are arranged and performing a gradation conversion by comparing each pixel of said image data with each of said threshold data of said dither matrix,
   wherein said dither matrix is obtained in a manner such that each threshold value of a blue noise mask is made to correspond to each threshold value area in said dither matrix, the threshold value of said blue noise mask is converted into a plurality of threshold data for forming a systematic dot array in said threshold value area, and said plurality of threshold data is arranged, and the dither matrix in which only the largest threshold data has been extracted in said threshold value area has frequency characteristics similar to those of said blue noise mask.

12. An apparatus according to claim 9, wherein said gradation conversion processing means comprises:
   quantizing means for converting said image data into print data by comparing said image data with said threshold data;
   correction value deciding means for deciding a quantization error caused by quantization every said threshold value area and deciding a correction value for correcting the image data corresponding to the threshold value area where a quantizing process is not performed;
   data storing means for accumulating said correction value; and
   data correcting means for correcting the image data corresponding to said threshold value area where the quantizing process is not performed by using said accumulated correction value.

13. An apparatus according to claim 12, wherein in the case where the number of threshold values in said threshold value area is equal to n and quantization errors of the image data corresponding to the threshold value areas are assumed to be E1 to En, said correction value deciding means sets a sum of E1 to En to the quantization error of said threshold value areas and decides said correction value as $1/n \cdot En$.

14. An apparatus according to claim 1, wherein the threshold data for forming said systematic dot array is threshold data in which dots concentrate regularly in the area due to a decrease in luminance value or an increase in density value of said image data.

* * * * *